(12) United States Patent
Abu Al-Rubb

(10) Patent No.: US 9,683,558 B2
(45) Date of Patent: Jun. 20, 2017

(54) POWER GENERATING DEVICE USING LIGHTNING

(71) Applicant: Khalil Abu Al-Rubb, Doha (QA)

(72) Inventor: Khalil Abu Al-Rubb, Doha (QA)

( * ) Notice: Subject to any disclaimer, the term of this patent is extended or adjusted under 35 U.S.C. 154(b) by 15 days.

(21) Appl. No.: 14/404,355

(22) PCT Filed: May 22, 2013

(86) PCT No.: PCT/GB2013/000237
§ 371 (c)(1),
(2) Date: Nov. 26, 2014

(87) PCT Pub. No.: WO2013/178973
PCT Pub. Date: Dec. 5, 2013

(65) Prior Publication Data
US 2015/0143804 A1    May 28, 2015

(30) Foreign Application Priority Data
May 31, 2012  (GB) .................................. 1209882.8

(51) Int. Cl.
*H05F 7/00* (2006.01)
*F03G 7/00* (2006.01)

(52) U.S. Cl.
CPC ...... *F03G 7/00* (2013.01); *H05F 7/00* (2013.01)

(58) Field of Classification Search
CPC ..................................... F03G 7/00; H05F 7/00
See application file for complete search history.

(56) References Cited

U.S. PATENT DOCUMENTS 4,576,124 A * 3/1986 Martens ............... F01K 23/108
                                                          122/406.5

FOREIGN PATENT DOCUMENTS

| CN | 101296536 A | 10/2008 | |
|----|-------------|---------|---|
| DE | 19716575 A1 * | 10/1998 | ............... H05F 7/00 |
| ES | 2285948 A1 | 11/2007 | |
| KR | 20040088002 A * | 10/2004 | |
| KR | 1020040088002 A | 10/2004 | |

OTHER PUBLICATIONS

European Search Report as received in application No. GB1209882.8 mailed Dec. 5, 2012.
International Search Report as received in application No. PCT/GB2013/000237 mailed Aug. 6, 2013.
PK Office Action dated Apr. 19, 2016 as received in Application No. 343/2013.
SG Office Action dated Jan. 5, 2016 as received in Application No. 11201407847P.
CO Examination Report dated Jun. 24, 2016.
CO Examination Report dated Jun. 24, 2016 Machine Transcribed.

* cited by examiner

*Primary Examiner* — Audrey K Bradley
(74) *Attorney, Agent, or Firm* — Maschoff Brennan

(57) ABSTRACT

A device to harvest energy from lightning is disclosed. The electrical energy of the lightning may be used to heat a fluid, which may then be used to drive a turbine to produce electricity. The electricity provided by the turbine is in a form suitable to either be used or stored. The lightning strikes an antenna and is conducted through an insulated chamber where it heats the fluid.

11 Claims, 9 Drawing Sheets

POWER GENERATING DEVICE USING LIGHTNING

FIELD OF THE INVENTION

The invention relates to a power generating device and a method for generating power.

BACKGROUND

Lightning is an atmospheric electrostatic discharge and can occur with both positive and negative polarity. Negative lightning typically carries an electric current of 30 kA, and transfers fifteen coulombs of electric charge and 500 MJ of energy. Positive lightning typically carries an electric current of approximately 300 kA.

Known lightening harvesting devices have proved unsuccessful as they fail to adequately store the electrical charge of a lightning strike.

SUMMARY

A first aspect of the invention provides a power generating device comprising a pressure chamber and a conductor for receiving a lightning strike. The conductor passes through the pressure chamber, the pressure chamber is a reservoir for a fluid and the fluid is heated when the conductor receives a lightning strike. The electrical energy of the lightning is transformed into kinetic energy in the molecules of the fluid. The storage of lightning energy in a form other than electricity allows for the energy to be easily captured and safely stored.

In some embodiments, the power generating device further comprises an antenna electrically connected to the conductor to receive the lightning strike. The antenna provides an electric field to reduce the resistance of a path through the conductor compared to a path to the earth not through the conductor.

In some embodiments, the pressure chamber is electrically insulated. The insulation resists flow of an electric lightning charge through the walls of the pressure chamber to earth. The lightning must flow through the pressure chamber for a greater distance as possible to maximise the heating of fluid within the chamber.

In some embodiments, the conductor comprises a section of increased electrical resistance within the pressure chamber. The section of the conductor with increased resistance compared to the resistance along the other lengths of the conductor will generate more heat per conductor unit length than the rest of the conductor. The increased heat production along the conductor within the fluid will provide a greater transfer of heat energy to the fluid.

In some embodiments, the power generating device further comprises a turbine in fluid communication with the pressure chamber. Fluid flows from the pressure chamber to the turbine. The turbine converts the pressure provided by the fluid flow from the pressure chamber into electrical energy.

In some embodiments, the power generating device further comprises a valve between the pressure chamber and the turbine, wherein the valve is operable to isolate the pressure chamber from the turbine. Pressurised fluid may be stored in the chamber when the valve is closed and released to drive the turbine, thereby creating electricity, when required.

In some embodiments, the power generating device further comprises pressurising means to pressurise the pressure chamber. The fluid within the pressure chamber may be pressurised by pumping more fluid into the chamber. This allows more kinetic energy to be stored by the fluid contained within the pressure chamber. Alternatively, the fluid in the pressure chamber may be pressurised by heating from a source excluding a lightning strike. The energy provided by this heating will be recoverable by the turbine as well as the energy imparted to the fluid by the lightning strike.

In some embodiments, the power generating device further comprises a second pressure chamber and conductor coupled to the turbine. Multiple pressure chambers attached to a single turbine reduce the resources required to carry out the invention with multiple chambers. Also, multiple chambers will provide a more even flow of pressure generated by lightning strikes.

A second aspect of the invention provides a method of generating power comprising conducting a lightning strike through an electrically insulated pressurised chamber, and channeling fluid heated by the energy of the lightning strike to a turbine. The fluid is displaced by expansion of the heated fluid. The lightning energy is converted and temporarily stored by heat energy and/or as latent heat energy of the fluid. The fluid, when released from the chamber, drives a turbine generating electrical energy which is then in a manageable form.

In some embodiments, the lightning strike is conducted through the pressure chamber by an electrically conducting structure. The method further comprises propelling an electrically conducting device in electrical contact with the electrically conducting structure away from the pressure chamber. The electrically conducting device has an associated electric field which, when targeted at charged areas of the atmosphere, will induce a lightning strike to the device. The lightning charge will be conducted to the electrically conducting structure and through the pressure chamber.

In some embodiments, the fluid is pressurised within the pressurised chamber prior to a lightning strike. The fluid within the pressure chamber may be pressurised by pumping more fluid into the chamber. This allows more kinetic energy to be stored by the fluid contained within the pressure chamber. Alternatively, the fluid in the pressure chamber may be pressurised by heating from a source excluding lightning. The energy provided by this heating will be recoverable by the turbine as well as energy imparted to the fluid by the lightning strike.

The invention will now be described, by way of example only, with reference to the accompanying drawings, in which:

DETAILED DESCRIPTION

Figure 1:
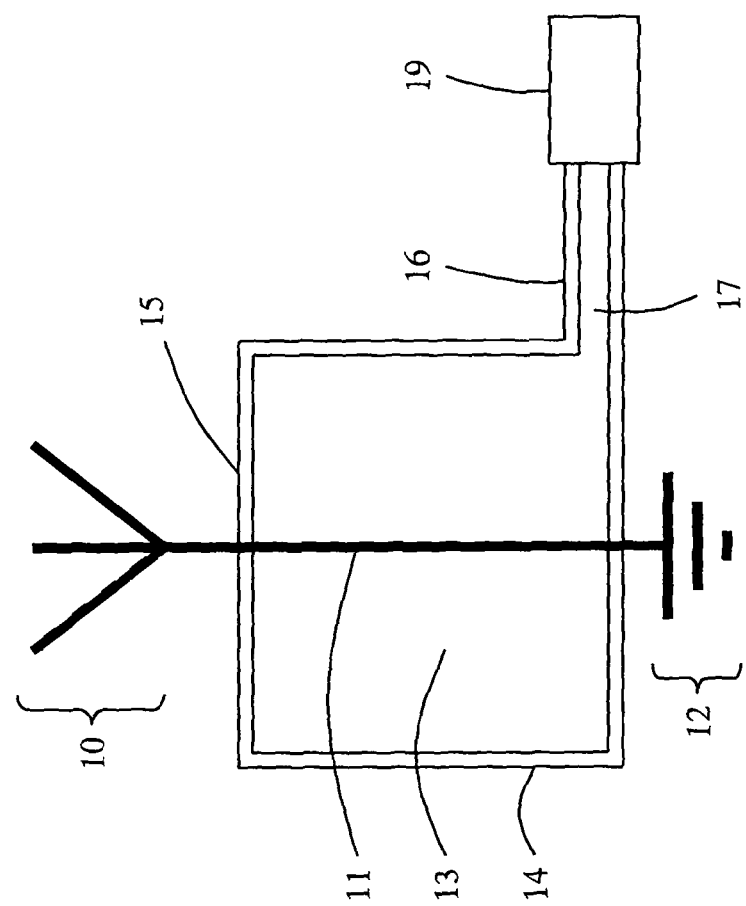
FIG. 1 is a sectional view of a first embodiment of a power generating device.

FIG. 1 shows a power generating device having an antenna 10 suitable to conduct high voltage, high current electricity for a short amount of time. The antenna 10 is electrically coupled through a conductor 11 grounded section 12 which can pass charge, received by the antenna 10, to earth. The conductor 11 passes through a chamber 13 formed by side walls 14, an upper wall 15 and a lower wall. The walls surrounding the chamber 13 are electrically and thermally insulated. The conductor passes through the upper 15 and lower wall. The chamber 13 is open to a pipe 16. The pipe 16 forms a channel 17 whereby fluid can flow from the chamber 13, through the channel 17, to a turbine 19.

In use, the antenna 10 is struck by lightning and a charge is conducted by the conductor 11 through the chamber 13 where it is then passed to earth via the grounded section 12 of the conductor 11. The insulated upper wall 15, side walls 14 and lower wall stop the charge created by the lightning strike from being conducted to earth prior to passing through the chamber 13. The current created by the charge passing through the conductor 11 creates heat due to the electrical resistance of the conductor. The heat is transmitted by radiation, convection and conduction to a fluid contained within the chamber 13. The heated fluid expands within the chamber 13, thus increasing the pressure of the fluid within the chamber. The pressurised fluid flows along the pipe 16 and into the turbine 19. The power of the pressurised fluid flow is transduced into electricity by the turbine 19.

Various modifications will be apparent to those skilled in the art. For example, chamber 13 can be cuboid, spherical, or any other shape suitable to form a chamber inside the insulating walls. The shape of the antenna 10 of FIG. 1 is merely representative of a possible embodiment and is not intended to limit the scope an antenna used with this invention any single structure. The antenna may be a conducting rod with a spiked or rounded tip, or any other shape suitable to receive a lightning strike.

Figure 2:
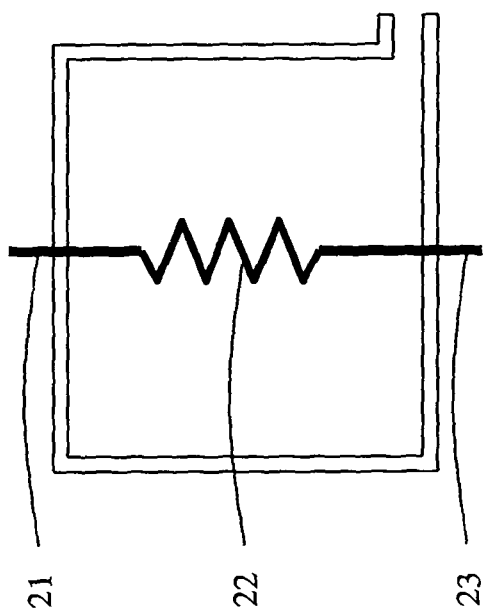
FIG. 2 is a sectional view of a chamber of a second embodiment of the power generating device.

FIG. 2 shows an embodiment of the conductor 21, 22, 23 shaped to increase the resistance of a section 22 of the conductor contained within the chamber. The conductor comprises an upper section 21, a resistive portion 22, and a lower portion 23. The resistive portion 22 is of greater length and of lesser diameter than compared to the surrounding conducting portions. The resistive portion 22 increases the resistance of the conductor within the chamber, thus increasing the amount of heat generated by the lightning current passing along the conducting element, through the chamber.

Figure 3:
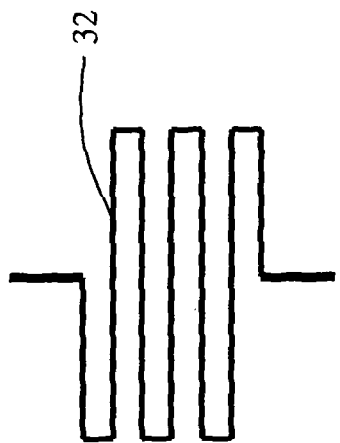
FIG. 3 is a sectional view of a first embodiment of a component of the power generating device.

FIG. 3 shows another embodiment of a shaped conductor 32 for use within the chamber. The shaped conductor 32 forms a pleated resistive element comprising a number of straight sections connected by a number of shorter sections of the element. This shaped conductor element 32 provides for a greater area of heating than that of the previously described embodiment 22.

Figure 4:
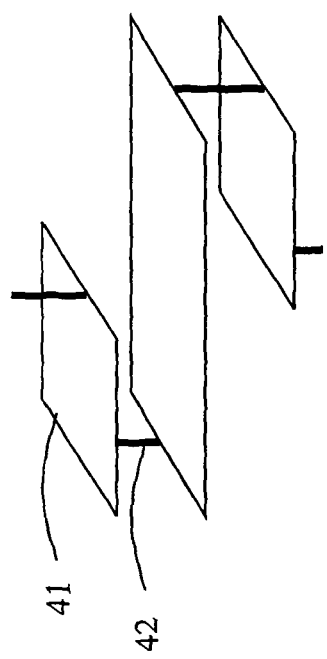
FIG. 4 is a perspective view of a second embodiment of a component of the power generating device.

FIG. 4 shows a further embodiment of a shaped conductor 32 for use within the chamber. The conductor 32 comprises a plurality of conductive horizontal plates 41 vertically coupled by conducting connecting portions 42. The connecting portions 42 are shown with a small cross-section compared to their length, however, in a another further embodiment the vertical connecting portions 42 have a width equal to that of the horizontal plates 41.

Figure 5:
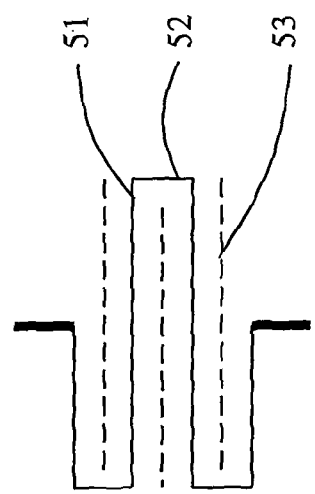
FIG. 5 is a sectional view of a third embodiment of a component of the power generating device.

FIG. 5 shows an additional embodiment of a shaped conductor comprising horizontal plates 51 and vertical plate connectors 52. The device further comprises insulating portions 53 disposed between the horizontal conducting plates 51. The insulating portions 53 prevent electricity from arcing through a dielectric fluid between any two horizontal plates. Arcing between plates may occur as a high electrostatic field is generated across the shaped conductor when subjected to the charge of a lightning strike.

Figure 6:
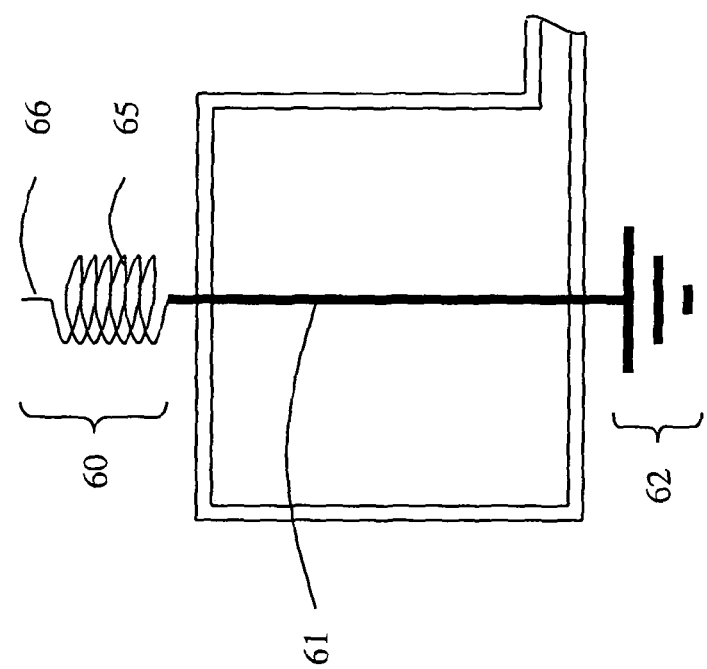
FIG. 6 is a sectional view of a third embodiment of a power generating device.

FIG. 6 shows an embodiment of a conductor 61 passing through a chamber. An upper part of the conductor 61 is coupled to an extendable antenna 60, and a lower part of the conductor 61 is coupled to a grounded section 62. The extendable antenna 60 comprises a conducting coil 65 and an antenna end 66. The coil 65 is flexible and can be straightened if drawn away from the conductor 61.

In use, the antenna end 66 is attached to a device to lengthen the conducting coil 65 in a direction away from the conductor 61. The antenna end may be attached to a rocket, kite, balloon or any other device to lengthen the coil. The extendable antenna 60 is used to extend a grounded conductive portion towards a thunder storm to induce a lightning strike to the conductor 61 via the antenna 60.

Figure 7:
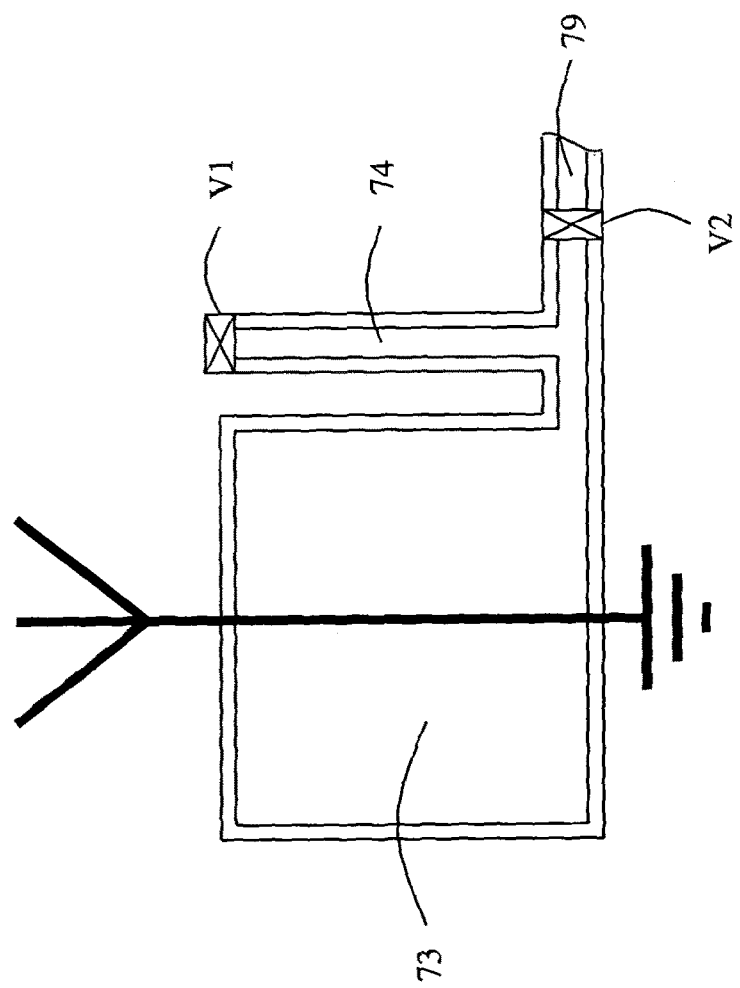
FIG. 7 is a sectional view of a fourth embodiment of a power generating device.

FIG. 7 shows an embodiment of the chamber 73 having a channel leading to a pressurising pipe 74, coupled to a first valve V1, and another channel leading to a second valve V2, coupled to a turbine channel 79. The turbine channel 79 leads to a turbine and pressurised fluid selectively flows down the channel 79 and the flow of which is controlled by the second valve V2. The first valve is operable to control fluid flowing into the chamber 73, which is used to pressurise the chamber.

In use, pressurised fluid may be pumped through the first valve V1, through the pressurising pipe 74, and into the chamber 73. Alternatively, the first valve V1 is opened to allow fluid into the chamber. The first valve V1 is then shut and the fluid within the chamber 73 is heated, thus the pressure within the chamber increases. The natural temperature variation during a day may be used to fill the chamber 73 with relatively cold air early in the day, and then the heat of the day is used to heat the captured cold air.

The pressure within the chamber 73 is maintained once pressurised. The chamber pressure is further increased by a lightning strike before being released by the second valve V2 to a turbine.

Figure 9:
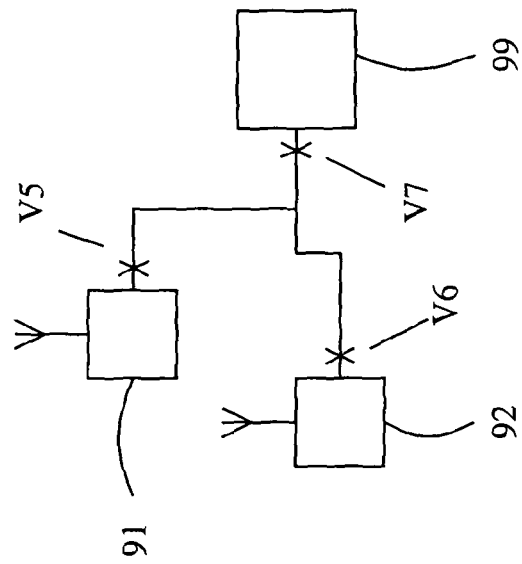
FIG. 9 is a schematic view of a second embodiment of a power generating system.
Figure 8:
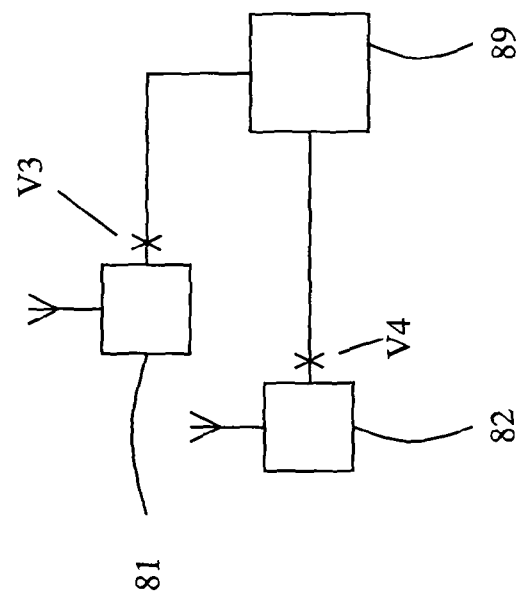
FIG. 8 is a schematic view of a first embodiment of a power generating system.

FIGS. 8 and 9 show a power generating system comprising a first pressure chamber 81, 91 and a second pressure chamber 82, 92. The first and second pressure chambers 81, 82, 91, 92 function as described above and are operable to release pressurised fluid resulting from lightning strike. The first and second pressure chambers 81, 82, 91, 92 are coupled to a turbine 89, 99 by a network of pipes through which pressurised fluid flows. A first valve V3, V5 is associated with the first pressure chamber 81, 91 output to control the flow of pressurised fluid out of the first chamber 81, 91 to the turbine 89, 99. A second valve V4, V6 is associated with the second pressure chamber 82, 92 output to control the flow of pressurised fluid flowing out of the second chamber 82, 92.

FIG. 8 shows the first and second valves V3, V4 coupled to the turbine 89 to supply pressurised fluid to drive the turbine 89.

FIG. 9 shows pipes of the first and second valves V5, V6 having a connection point prior to a single pipe prior to them being coupled to the turbine 99. A third valve V7, may be included to control the amount of fluid flowing into the turbine 99. In this embodiment, the third valve V7 allows the containment and storage of pressurised fluid within the connecting network between the first, second and third valves V5, V6, V7.

In the embodiments of FIGS. 8 and 9, multiple pressure chambers 81, 82, 91, 92 are connected to a turbine 89, 99. This reduces the amount of infrastructure required to provide the invention for a set number of pressure chambers. With an increased number of pressure chambers, the turbine is kept supplied with pressure more consistently.

Figure 10:
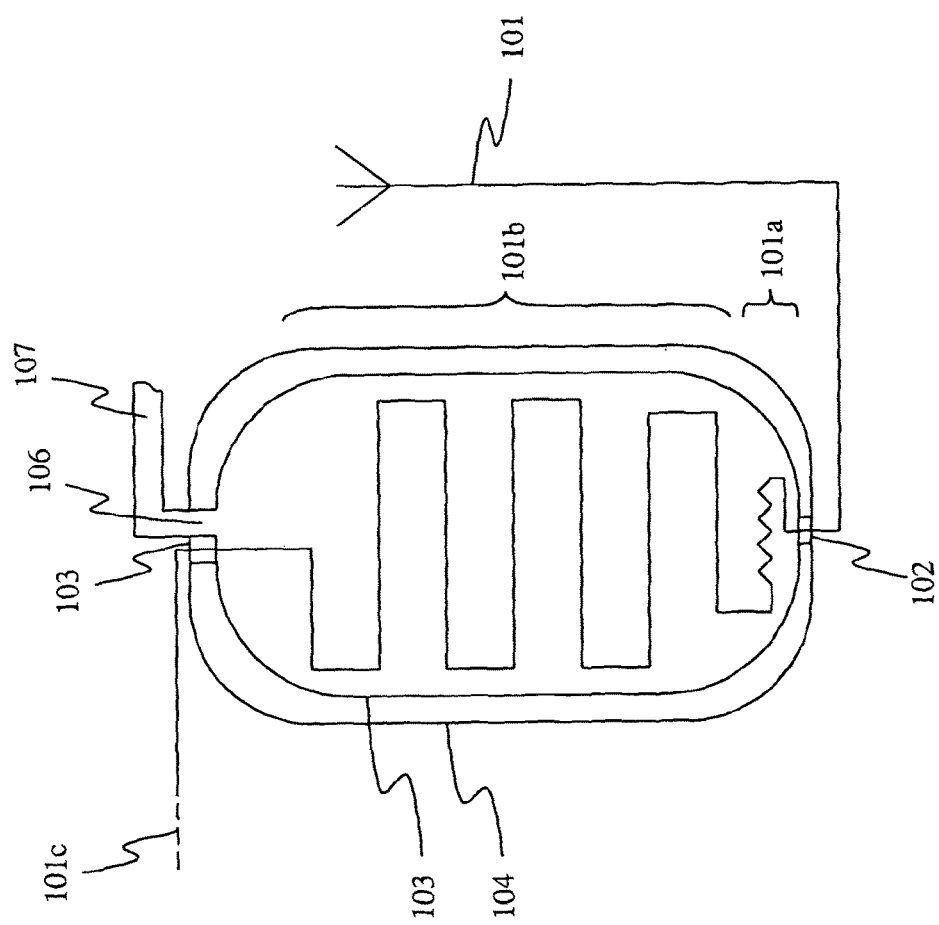
FIG. 10 is a sectional view of a fifth embodiment of a power generating device.

FIG. 10 shows a power generating device having an antenna suitable to receive a high voltage charge. The antenna is electrically coupled to a conductor 101 which passes through a pressure vessel 103, 104. The conductor 101 enters the pressure vessel 103, 104 through a first plugged opening 102 and exits the pressure vessel through a second plugged opening 103. The pressure vessel has a first wall 103 and a second wall 104 surrounding the first wall. The double wall pressure vessel 103, 104 provides a thermally insulative pressure vessel. An opening 106 in the top of the pressure vessel 103, 104 allows fluid communication by a pressure channel 107 with the space defined by the first pressure vessel 103. The top of the pressure vessel 103, 104 is the part of the vessel in a lowest gravitational field.

The conductor comprises a first section 101a within the bottom first pressure vessel 103 with a higher electrical resistance compared to the rest of the conductor sections. The bottom of the pressure vessel 103, 104 is the part of the vessel in a highest gravitational field. The conductor 101 further comprises a second section 101b within the pressure vessel 103 with electrical resistance lower than that of the first section 101a. A third section 101c of conductor is external to the pressure vessel 103, 104 and coupled to the first section 101a by the second section 101b. The third section 101c of conductor is coupled to ground, but may pass through one or more additional pressure vessels prior to coupling to ground.

In use, charge entering the antenna flows along the conductor 101. Current flows through the first section 101a of the conductor heating a fluid contained by the first pressure vessel wall 103. The first fluid may be liquid water, for example. The water will surround the first section 101a as the water collects at the bottom of the pressure vessel under gravity. The current flowing through the resistive first section 101a provides heat which is transmitted to the water. The water may boil and turn into water vapour (steam) within the first pressure vessel wall 103. The water vapour is contained by the first pressure vessel wall 103 and further heated by the second section 101b of the conductor, which is heated by the current passing through the conductor. If the pressure channel 107 is closed, the pressure within the pressure vessel 103, 104 will increase. The thermally insulating walls of the pressure vessel 103, 104, and the heated conducting portions 101a, 101b within the pressure vessel 103, 104 maintain water as water vapour within the pressure vessel. The pressurised steam within the pressure vessel 103, 104 is selectively released from the vessel through the pressure channel 107 to a turbine (not shown).

Figure 11:
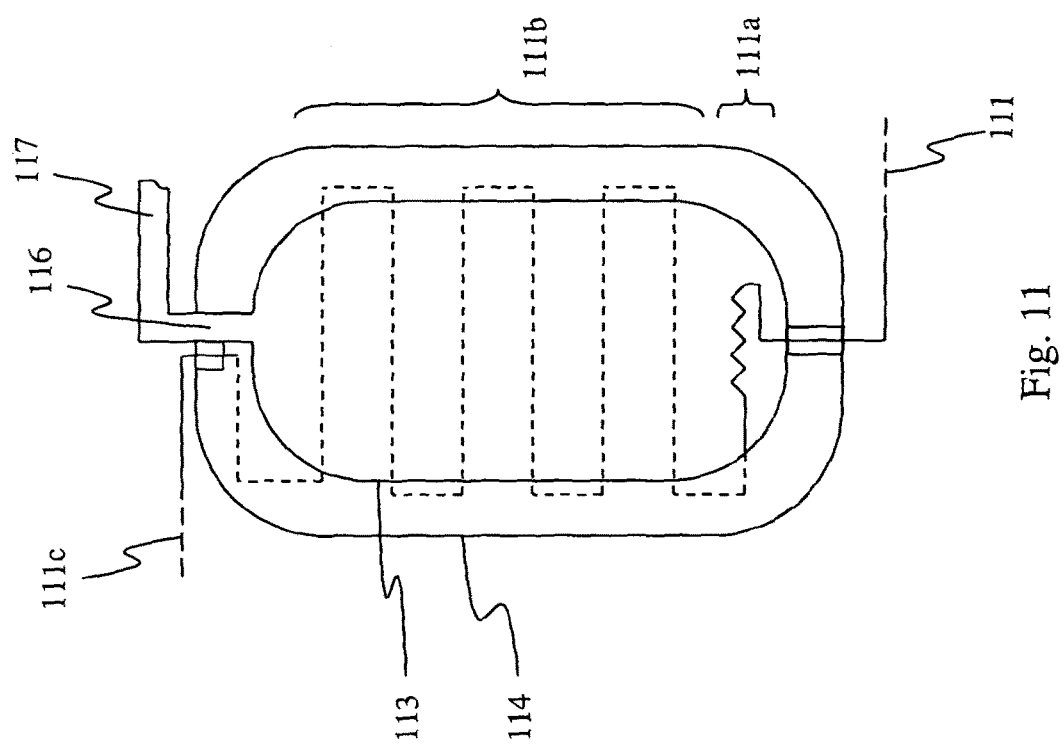
FIG. 11 is a sectional view of a sixth embodiment of a power generating device.
Figure 12:
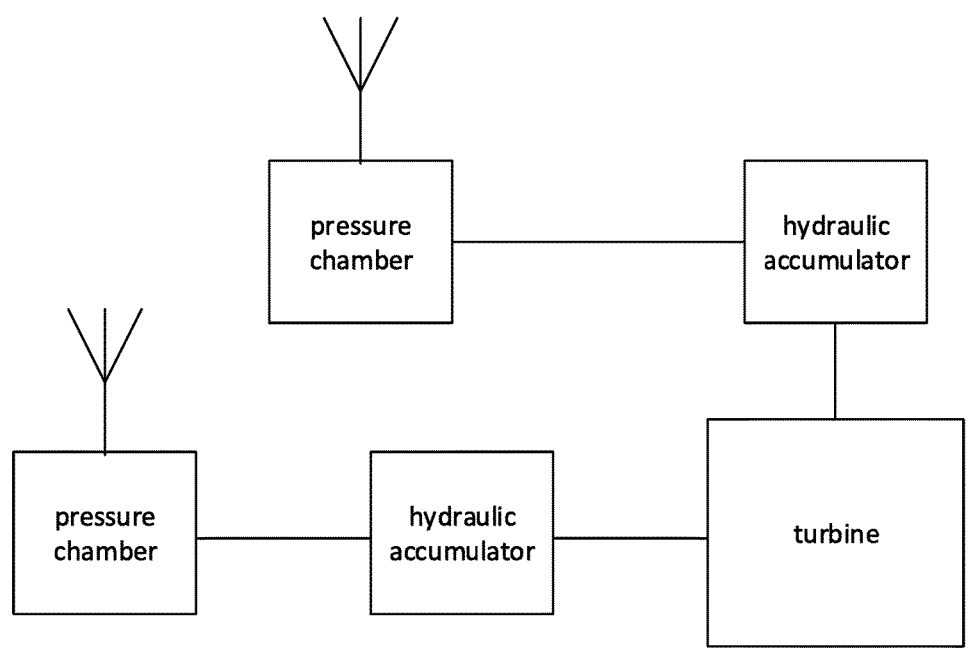
FIG. 12 is a block diagram showing a hydraulic accumulator inserted between a pressure vessel and a turbine to regulate the pressure supplied to the turbine.

FIG. 11 shows a power generating device with a double wall pressure vessel comprising a first wall 113 inside a second wall 114. The pressure vessel 113, 114 has an opening 116 through which fluid can flow into a pressure channel 117. A conductor 111 passes through the pressure vessel 113, 114. Within the pressure vessel 113, 114, the conductor has two sections—a first conductor section 111a has a high electrical resistance and is situated near the bottom of first wall 113 of the pressure vessel, and a second conductor section 111b is in between the first 113 and second 114 walls of the pressure vessel. A third conductor section 111c is coupled to the second 111b and extends from the pressure vessel to ground. The third conductor section 111c can couple directly to ground, or through another pressure vessel prior to connecting to ground.

In use, the conductor 111 is coupled to a lightening rod and receives a charge from a lightening strike. The inner first wall 113 of the pressure vessel is at lease partially filled with a liquid, such as water. The first conducting portion 111a is submerged within the water and a current flowing through the first portion heats up the water. If the pressure within first wall 113 is sufficiently low, the water will boil producing water vapour (steam). The second conducting portion 111b at least partially surrounds the exterior of the first wall 113 of the pressure vessel. Current passing through the second conductor section 111b heats up the inner first wall 113, thus any fluid contained by the inner wall is heated. If there is pressurised steam within the cavity defined by the inner wall 113, the steam is prevented from condensing into liquid water on the inner wall surface.

Electrically shielding material may be coated on the inner surface 103, 113 of the inner wall of the pressure vessel and optionally may be inserted between any adjacent conducting elements 101, 101a, 101b, 101c to prevent arcing.

In one embodiment, the turbine is coupled to a power grid to supply the grid with power harvested from one or more lightning strikes. In another embodiment, a turbine is isolated from a power grid network and the power generated by the turbine is either stored or used locally.

In a yet further embodiment, the heated fluid provided to the turbine by a pressure chamber is further used to heat buildings after the fluid has powered the turbine. Buildings are either heated directly by the heated fluid, or instead a second fluid is heated by a heat exchange mechanism and the second fluid is then used for central heating a number of buildings.

In alternative embodiments, different types of fluids may be used to fill the chambers. The fluids include gases, such as air and carbon dioxide, and liquids, such as rain water, sewer water, treated sewer effluent, or sea water.

An embodiment of the invention provides pressure chambers and turbines for powering sewer pumping stations and storm water pumping stations. Such a pumping station, often in an isolated location, suffers from power failures by separation from a power grid network during a storm, which can lead to local flooding. The failure is caused by damage to power lines by objects, such as tree branches, being affected by high winds. Such storms are often associated with lightning events, which may be used by the pressure chambers in combination with the turbine to provide electricity to power the pumping station.

A further embodiment provides a pressure chamber and turbine arrangement operable to supply power locally to a telecommunications system. The embodiment will provide un-interrupted cellular service to the telecommunications system should grid-supplied power be interrupted during a thunder storm.

One embodiment of the invention provides a turbine powered by an aforementioned pressure vessel and a sewage storage tank. The sewage storage tank generates gas from waste decomposition which is used to power the turbine. The gas produced by the sewage storage tank is largely methane. The turbine is either driven by the pressure of the methane gas, or by the energy released when the methane gas is combusted. Another embodiment of the invention provides ultrasonic agitation to the sewage in the sewer storage tank to increase methane production, thus increasing the efficiency of the sewage tank and turbine energy system.

A hydraulic accumulator may be used to store pressure produced by an aforementioned energy storage device or pressure vessel. A hydraulic accumulator is an energy storage device comprising a pressure storage reservoir in which a non-compressible hydraulic fluid is held under pressure by an external source such as a spring, a raised weight, or a compressed gas. If the energy storage device is used to store energy of a pressurised fluid, the stored pressure may be later released at a controlled rate to maximise the efficiency of a turbine coupled to the hydraulic accumulator. The hydraulic accumulator may be inserted between a pressure vessel and a turbine to regulate the pressure supplied to a turbine.

Any aforementioned turbine may be a micro-turbine. Micro-turbines are smaller than conventional turbines, with a smaller power output than a conventional turbine. The micro-turbine is cheaper to install and run, and can be installed in a domestic residence. The small size and power output mean that multiple micro-turbines may be used in parallel. The hydraulic accumulator is operable to store pressure to supply to a micro-turbine. The combination of a pressure accumulator and a micro-turbine allow a large amount of pressure to be stored and later released slowly and intermittently to power the micro-turbine.

What is claimed is:

1. A system, comprising:
a power generating device, having:
   a pressure chamber; and
   a conductor for receiving a lightning strike; wherein
      the conductor passes through the pressure chamber;
      the pressure chamber is a reservoir for a fluid;
      the pressure chamber includes a first wall enclosing the fluid, and a second wall surrounding the first wall; and
      the pressure chamber is arranged such that when the conductor receives a lightning strike, the fluid is pressurized; and
a turbine in fluid communication with the power generating device and a hydraulic accumulator between the turbine and the pressure chamber of the power generating device, the hydraulic accumulator being arranged to store pressure produced by the power generating device, and further arranged to release stored pressure to the turbine.

2. A system for generating energy from a lightning strike, the system comprising a power generating device, comprising:
a pressure chamber incorporating a reservoir for a fluid;
a first conductor for receiving a lightning strike; wherein:
   the pressure chamber is arranged such that when the first conductor receives a lightning strike, the fluid is pressurized; and
   the first conductor passes through the chamber, and is formed of a plurality of conductive plates coupled together by one or more second conductor; and
a turbine in fluid communication with the power generating device, wherein the system is arranged such that fluid pressurized in the power generating devices flows to the turbine.

3. A system, comprising:
a plurality of power generating devices, the devices having:
   a pressure chamber; and
   a conductor for receiving a lightning strike; wherein:
      the conductor passes through the pressure chamber;
      the pressure chamber is a reservoir for a fluid; and
      the pressure chamber is arranged such that when the conductor receives a lightning strike the fluid is pressurized;
a turbine in fluid communication with the plurality of power generating devices;
wherein the system is arranged such that the fluid pressurized in the power generating devices flows to the turbine; and
one or more of the pressure chambers of the plurality of power generating devices has a first wall and a second wall surrounding the first wall, and wherein the conductor at least partially surrounds the first wall of the pressure chamber, and wherein the first wall encloses the fluid.

4. The system according to claim 3, wherein each pressure chamber comprises a valve between the pressure chamber and the turbine, arranged to selectively release pressure from the pressure chamber.

5. The system according to claim 3, further comprising a hydraulic accumulator between the turbine and each pressure chamber of the plurality of power generating devices, the accumulator arranged to store pressure produced by the power generating devices, and further arranged to release stored pressure to the turbine.

6. The system according to claim 3, wherein the conductors comprise a section of increased electrical resistance within the pressure chambers.

7. The system according to claim 3, wherein one or more of the power generating devices is pressurized by pumping fluid into the chamber.

8. A method of generating power comprising:
conducting a lightning strike through two or more electrically insulated pressurized chambers using a conductor; and
channeling fluid heated by energy of the lightning strike from the two or more pressurized chambers to a turbine;
wherein the fluid is displaced by expansion of heated fluid and one or more of the electrically insulated chambers comprises a first wall and a second wall surrounding the first wall, wherein the first wall encloses the fluid, and wherein the conductor at least partially surrounds the first wall of the pressure chamber.

9. The method according to claim 8,
wherein the method further comprises selectively channeling the fluid from the two or more pressurized chambers to the turbine through pressure release valves.

10. The method according to claim 8, further comprising storing pressure generated in the two or more pressurized chambers in a hydraulic accumulator, and selectively releasing the stored pressure to the turbine.

11. The method according to claim 8, further comprising pressurizing the fluid within the two or more pressurized chamber prior to the lightning strike.

* * * * *